United States Patent
Radtke

(10) Patent No.: US 7,795,994 B2
(45) Date of Patent: Sep. 14, 2010

(54) POWER LINE COUPLING DEVICE AND METHOD

(75) Inventor: William O. Radtke, Ellicott City, MD (US)

(73) Assignee: Current Technologies, LLC, Germantown, MD (US)

( * ) Notice: Subject to any disclaimer, the term of this patent is extended or adjusted under 35 U.S.C. 154(b) by 438 days.

(21) Appl. No.: 11/768,871

(22) Filed: Jun. 26, 2007

(65) Prior Publication Data

US 2009/0002094 A1 Jan. 1, 2009

(51) Int. Cl.
*H01P 5/12* (2006.01)
*G05B 11/00* (2006.01)

(52) U.S. Cl. ............. 333/100; 340/310.12; 340/310.17; 340/538.12; 340/538.16

(58) Field of Classification Search .................. 333/100, 333/25, 26; 340/310.13, 310.15, 310.17, 340/538.12, 538.16
See application file for complete search history.

(56) References Cited

U.S. PATENT DOCUMENTS 1,547,242 A 7/1925 Strieby (Continued)

FOREIGN PATENT DOCUMENTS

DE 100 12 235 C2 12/2001

(Continued)

OTHER PUBLICATIONS

"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)*, (May 1992),1-11.

(Continued)

*Primary Examiner*—Robert Pascal
*Assistant Examiner*—Kimberly E Glenn
(74) *Attorney, Agent, or Firm*—Mel Barnes; Capital Legal Group, LLC

(57) ABSTRACT

A power line coupler for communicating data signals over a power distribution system having a first and second overhead energized medium voltage power line conductors is provided. In one embodiment, the coupler includes a first lightening arrestor having a first end and a second end, wherein the first end of the first arrestor is connected to the first power line conductor. The coupler further includes a first high frequency impedance having a first end connected to the second end of the first lightening arrestor and the first impedance having a second end connected to a neutral conductor of the power line distribution system. The coupler may further include a second lightening arrestor having a first end and a second end, wherein the first end of the second arrestor is connected to the second power line conductor. The coupler further including a second high frequency impedance having a first end connected to the second end of the second lightening arrestor and a second end connected to the neutral conductor. The first high frequency impedance and the second high frequency impedance may each comprise an air core coil that forms an inductor. The coupler may further include a balun having a first winding and a second winding, wherein the first winding is coupled to a communication device, and wherein the second winding has a first end connected to the first end of the first high frequency impedance and a second end connected to the first end of the second high frequency impedance.

26 Claims, 7 Drawing Sheets

U.S. PATENT DOCUMENTS

| | | | |
|---|---|---|---|
| 1,607,668 A * | 11/1926 | Fetter | 455/60 |
| 2,577,731 A | 12/1951 | Berger | |
| 3,369,078 A | 2/1968 | Stradley | |
| 3,696,383 A | 10/1972 | Oishi et al. | |
| 3,701,057 A | 10/1972 | Hoer | |
| 3,702,460 A | 11/1972 | Blose | |
| 3,810,096 A | 5/1974 | Kabat et al. | |
| 3,846,638 A | 11/1974 | Wetherell | |
| 3,895,370 A | 7/1975 | Valentini | |
| 3,942,170 A | 3/1976 | Whyte | |
| 3,962,547 A | 6/1976 | Pattantyus-Abraham | |
| 4,004,110 A | 1/1977 | Whyte | |
| 4,016,429 A | 4/1977 | Vercellotti et al. | |
| 4,057,793 A | 11/1977 | Johnson et al. | |
| 4,142,178 A | 2/1979 | Whyte et al. | |
| 4,188,619 A | 2/1980 | Perkins | |
| 4,254,402 A | 3/1981 | Perkins | |
| 4,263,549 A | 4/1981 | Toppeto | |
| 4,323,882 A | 4/1982 | Gajjar | |
| 4,383,243 A | 5/1983 | Krügel et al. | |
| 4,433,284 A | 2/1984 | Perkins | |
| 4,481,501 A | 11/1984 | Perkins | |
| 4,569,045 A | 2/1986 | Schieble et al. | |
| 4,633,218 A * | 12/1986 | Palsgrove et al. | 375/334 |
| 4,636,771 A | 1/1987 | Ochs | |
| 4,652,855 A | 3/1987 | Weikel | |
| 4,668,934 A | 5/1987 | Shuey | |
| 4,675,648 A | 6/1987 | Roth et al. | |
| 4,686,382 A | 8/1987 | Shuey | |
| 4,697,166 A | 9/1987 | Warnagiris et al. | |
| 4,724,381 A | 2/1988 | Crimmins | |
| 4,745,391 A | 5/1988 | Gajjar | |
| 4,746,897 A | 5/1988 | Shuey | |
| 4,890,089 A | 12/1989 | Shuey | |
| 4,973,940 A | 11/1990 | Sakai et al. | |
| 5,210,519 A | 5/1993 | Moore | |
| 5,257,006 A | 10/1993 | Graham et al. | |
| 5,351,272 A | 9/1994 | Abraham | |
| 5,485,040 A | 1/1996 | Sutterlin | |
| 5,497,142 A | 3/1996 | Chaffanjon | |
| 5,537,087 A | 7/1996 | Naito | |
| 5,559,377 A | 9/1996 | Abraham | |
| 5,592,354 A | 1/1997 | Nocentino, Jr. | |
| 5,625,863 A | 4/1997 | Abraham | |
| 5,684,450 A | 11/1997 | Brown | |
| 5,694,108 A | 12/1997 | Shuey | |
| 5,705,974 A | 1/1998 | Patel et al. | |
| 5,717,685 A | 2/1998 | Abraham | |
| 5,770,996 A | 6/1998 | Severson et al. | |
| 5,818,127 A | 10/1998 | Abraham | |
| 5,850,114 A | 12/1998 | Froidevaux | |
| 5,856,776 A | 1/1999 | Armstrong et al. | |
| 5,864,284 A | 1/1999 | Sanderson et al. | |
| 5,892,430 A | 4/1999 | Wiesman et al. | |
| 5,929,750 A | 7/1999 | Brown | |
| 5,933,071 A | 8/1999 | Brown | |
| 5,933,073 A | 8/1999 | Shuey | |
| 5,949,327 A | 9/1999 | Brown | |
| 5,952,914 A * | 9/1999 | Wynn | 370/290 |
| 5,994,998 A | 11/1999 | Fisher et al. | |
| 6,014,386 A | 1/2000 | Abraham | |
| 6,023,106 A | 2/2000 | Abraham | |
| 6,040,759 A | 3/2000 | Sanderson | |
| 6,104,707 A | 8/2000 | Abraham | |
| 6,140,911 A | 10/2000 | Fisher et al. | |
| 6,144,292 A | 11/2000 | Brown | |
| 6,172,597 B1 | 1/2001 | Brown | |
| 6,255,935 B1 | 7/2001 | Lehmann et al. | |
| 6,282,405 B1 | 8/2001 | Brown | |
| 6,297,730 B1 | 10/2001 | Dickinson | |
| 6,396,392 B1 | 5/2002 | Abraham | |
| 6,407,987 B1 | 6/2002 | Abraham | |
| 6,452,482 B1 | 9/2002 | Cern | |
| 6,515,485 B1 | 2/2003 | Bullock et al. | |
| 6,624,745 B1 | 9/2003 | Willer | |
| 6,646,447 B2 | 11/2003 | Cern et al. | |
| 6,683,531 B2 | 1/2004 | Diamanti et al. | |
| 6,686,832 B2 | 2/2004 | Abraham | |
| 6,753,742 B2 | 6/2004 | Kim | |
| 6,785,532 B1 | 8/2004 | Rickard | |
| 6,809,633 B2 | 10/2004 | Cern | |
| 6,844,810 B2 | 1/2005 | Cern | |
| 6,922,135 B2 | 7/2005 | Abraham | |
| 6,933,835 B2 | 8/2005 | Kline | |
| 6,950,567 B2 | 9/2005 | Kline | |
| 6,958,680 B2 | 10/2005 | Kline | |
| 6,965,302 B2 | 11/2005 | Mollenkopf et al. | |
| 6,965,303 B2 | 11/2005 | Mollenkopf | |
| 6,975,210 B2 | 12/2005 | Cern | |
| 6,980,089 B1 | 12/2005 | Kline | |
| 6,980,090 B2 | 12/2005 | Mollenkopf | |
| 6,982,611 B2 | 1/2006 | Cope | |
| 6,998,962 B2 | 2/2006 | Cope et al. | |
| 7,042,351 B2 | 5/2006 | Kline | |
| 7,046,124 B2 | 5/2006 | Cope et al. | |
| 7,046,882 B2 | 5/2006 | Kline | |
| 7,061,370 B2 | 6/2006 | Cern | |
| 7,064,647 B2 * | 6/2006 | Edmunds et al. | 336/229 |
| 7,102,478 B2 | 9/2006 | Pridmore et al. | |
| 7,145,440 B2 | 12/2006 | Gerszberg et al. | |
| 7,248,148 B2 | 7/2007 | Kline et al. | |
| 7,307,511 B2 | 12/2007 | Kline | |
| 7,522,812 B2 * | 4/2009 | Zitting | 385/147 |
| 2001/0038329 A1 | 11/2001 | Diamanti et al. | |
| 2001/0052843 A1 | 12/2001 | Wiesman et al. | |
| 2001/0054953 A1 | 12/2001 | Kline | |
| 2002/0002040 A1 | 1/2002 | Kline et al. | |
| 2002/0097953 A1 | 7/2002 | Kline | |
| 2002/0105413 A1 | 8/2002 | Cern et al. | |
| 2002/0109585 A1 | 8/2002 | Sanderson | |
| 2002/0110310 A1 | 8/2002 | Kline | |
| 2002/0110311 A1 | 8/2002 | Kline | |
| 2002/0118101 A1 | 8/2002 | Kline | |
| 2002/0121963 A1 | 9/2002 | Kline | |
| 2002/0154000 A1 | 10/2002 | Kline | |
| 2002/0171535 A1 | 11/2002 | Cern | |
| 2003/0054793 A1 | 3/2003 | Manis et al. | |
| 2003/0160684 A1 | 8/2003 | Cern | |
| 2003/0169155 A1 | 9/2003 | Mollenkopf et al. | |
| 2003/0201759 A1 | 10/2003 | Cern | |
| 2003/0201873 A1 | 10/2003 | Cern | |
| 2003/0210135 A1 | 11/2003 | Cern | |
| 2003/0222747 A1 | 12/2003 | Perkinson et al. | |
| 2003/0222748 A1 | 12/2003 | Cern et al. | |
| 2003/0232599 A1 | 12/2003 | Dostert et al. | |
| 2003/0234713 A1 | 12/2003 | Pridmore, Jr. et al. | |
| 2004/0003934 A1 | 1/2004 | Cope | |
| 2004/0032320 A1 | 2/2004 | Zalitzky et al. | |
| 2004/0056734 A1 | 3/2004 | Davidow | |
| 2004/0090284 A1 | 5/2004 | Cern | |
| 2004/0104798 A1 | 6/2004 | Cern | |
| 2004/0110483 A1 | 6/2004 | Mollenkopf | |
| 2004/0113756 A1 | 6/2004 | Mollenkopf | |
| 2004/0113757 A1 | 6/2004 | White, II et al. | |
| 2004/0135676 A1 | 7/2004 | Berkman et al. | |
| 2004/0142599 A1 | 7/2004 | Cope et al. | |
| 2004/0183619 A1 | 9/2004 | Sugg | |
| 2004/0196144 A1 | 10/2004 | Crenshaw et al. | |
| 2004/0223617 A1 | 11/2004 | Corcoran et al. | |
| 2004/0227621 A1 | 11/2004 | Cope et al. | |
| 2004/0227622 A1 | 11/2004 | Giannini et al. | |
| 2005/0046550 A1 | 3/2005 | Crenshaw et al. | |
| 2005/0077868 A1 | 4/2005 | Cern | |
| 2005/0122092 A1 | 6/2005 | Blasco Claret et al. | |

| | | | |
|---|---|---|---|
| 2005/0164666 A1 | 7/2005 | Lang et al. | |
| 2005/0168326 A1 | 8/2005 | White et al. | |
| 2005/0194944 A1 | 9/2005 | Folts et al. | |
| 2006/0036388 A1 | 2/2006 | Swarztrauber | |
| 2006/0044076 A1 | 3/2006 | Law | |
| 2006/0079198 A1 | 4/2006 | Sanderson | |
| 2006/0082219 A1 | 4/2006 | Gerszberg et al. | |
| 2006/0087382 A1 | 4/2006 | Cern | |
| 2006/0244571 A1 | 11/2006 | Yaney et al. | |
| 2006/0261920 A1 | 11/2006 | Cern et al. | |
| 2006/0262881 A1 | 11/2006 | Cern | |
| 2006/0290476 A1 | 12/2006 | Zitting et al. | |
| 2007/0178850 A1 | 8/2007 | Sandahl et al. | |
| 2007/0252658 A1 | 11/2007 | Bumiller | |
| 2008/0007416 A1 | 1/2008 | Cern | |

FOREIGN PATENT DOCUMENTS

| | | | |
|---|---|---|---|
| DE | 101 03 530 A1 | 8/2002 | |
| DE | 101 19 039 A1 | 12/2002 | |
| DE | 101 19 040 A1 | 12/2002 | |
| EP | 0 470 185 B1 | 11/1995 | |
| EP | 0 913 955 A2 | 5/1999 | |
| EP | 0 948 143 A2 | 10/1999 | |
| EP | 0 959 569 A1 | 11/1999 | |
| EP | 0 916 194 B1 | 9/2001 | |
| EP | 1 213 849 A1 | 6/2002 | |
| GB | 2 331 683 A | 5/1999 | |
| GB | 2 341 776 A | 3/2000 | |
| JP | 1276933 | 11/1989 | |
| JP | 08203739 A | * 8/1996 | |
| WO | WO-92/16920 A1 | 10/1992 | |
| WO | WO-98/33258 A2 | 7/1998 | |
| WO | WO-00/59076 A1 | 10/2000 | |
| WO | WO-00/60701 A1 | 10/2000 | |
| WO | WO-01/08321 A1 | 2/2001 | |
| WO | WO-01/43305 A1 | 6/2001 | |
| WO | WO-03/034608 A2 | 4/2003 | |
| WO | WO-03/040732 A2 | 5/2003 | |
| WO | WO-2004/021600 A1 | 3/2004 | |

OTHER PUBLICATIONS

"Intellon Corporation Test Summary for Transformerless Coupler Study", *Intellon No News Wires, DOT/NHTSA Order No. DTNH22-98-P-07632*, (Dec. 24, 1998),1-18.

"EMETCON Automated Distribution System", *ABB Power T & D Company, Inc*, (Jan. 1990),1-14.

"Centralized Commercial Building Applications with the Lonworks ® PLT-21 Power Line Transceiver", *Lonworks Engineering Bulletin, Echelon*, (Apr. 1997),1-22.

Abraham, K C., et al., "A Novel High-Speed PLC Communication Modem", *IEEE Transactions on Power Delivery*, (Oct. 1992),1760-1768.

Barstow, J M., "A Carrier Telephone System for Rural Service", *AIEE Transactions*, (1947),301-307.

Chang, SS L., "Power-Line Carrier", *Fundamentals Handbook of Electrical and Computing Engineering, vol. II-Communication, Control, Devices and Systems*, (1983),617-627.

Coakley, N G., et al., "Real-Time Control of a Servosytem Using the Inverter-Fed Power Lines to Communicate Sensor Feedback", *IEEE Transactions on Industrial Electronics*, (1999),360-369.

Lim, C K., et al., "Development of a Test Bed for High-Speed Power Line Communications", *School of Electrical and Electronic Engineering, Nanyang Technological University, Singapore, IEEE*, (2000),451-456.

Naredo, J L., et al., "Design of Power Line Carrier Systems on Multitransposed Delta Transmission Lines", *IEEE Transactions on Power Delivery*, (1991),952-958.

"Demand Side Management with LONWORKS® Power Line Transceivers", *LONWORKS Engineering Bulletin*, (Dec. 1996),1-36.

"Summary of an IEEE Guide for Power-Line Carrier Applications", *IEEE Transactions on Power Apparatus and Systems*, (Nov./Dec. 1980),2334-2337.

Hasler, E F., et al., "Communication Systems Using Bundle Conductor Overhead Power Lines", *IEEE Transactions on Power Apparatus and Systems*, (Mar./Apr. 1975),344-349.

"IEEE Guide for Power-Line Carrier Applications, ANSI/IEEE Std 643-1980", *The Institute of Electrical and Electronics Engineers, Inc.*, (1980),1-80.

Liu, E et al., "Broadband Characterization of Indoor Powerline Channel", *Communications Laboratory, Helsinki University of Technology, Finland [presented at the 2004 International Symposium on PowerLine Communications and its Applications, Zaragoza, Spain*, (Mar. 31-Apr. 2, 2004).

Horiguchi, Akira "High Speed Power Line Communication Technology", *Mitsubishi Electric Advance* vol. 109, (Mar. 2005),1-27.

"White Paper on Medium Voltage Powerline Communication (PLC) Networks", *CIGRE SC D2 WG 14, Broadband PLC*, (Mar. 2005),1-58.

"White Paper on Medium Voltage Powerline Communication (PLC) Networks Annexes", *CIGRE SC D2 WG 14, Broadband PLC*, (Apr. 2005),1-15.

* cited by examiner

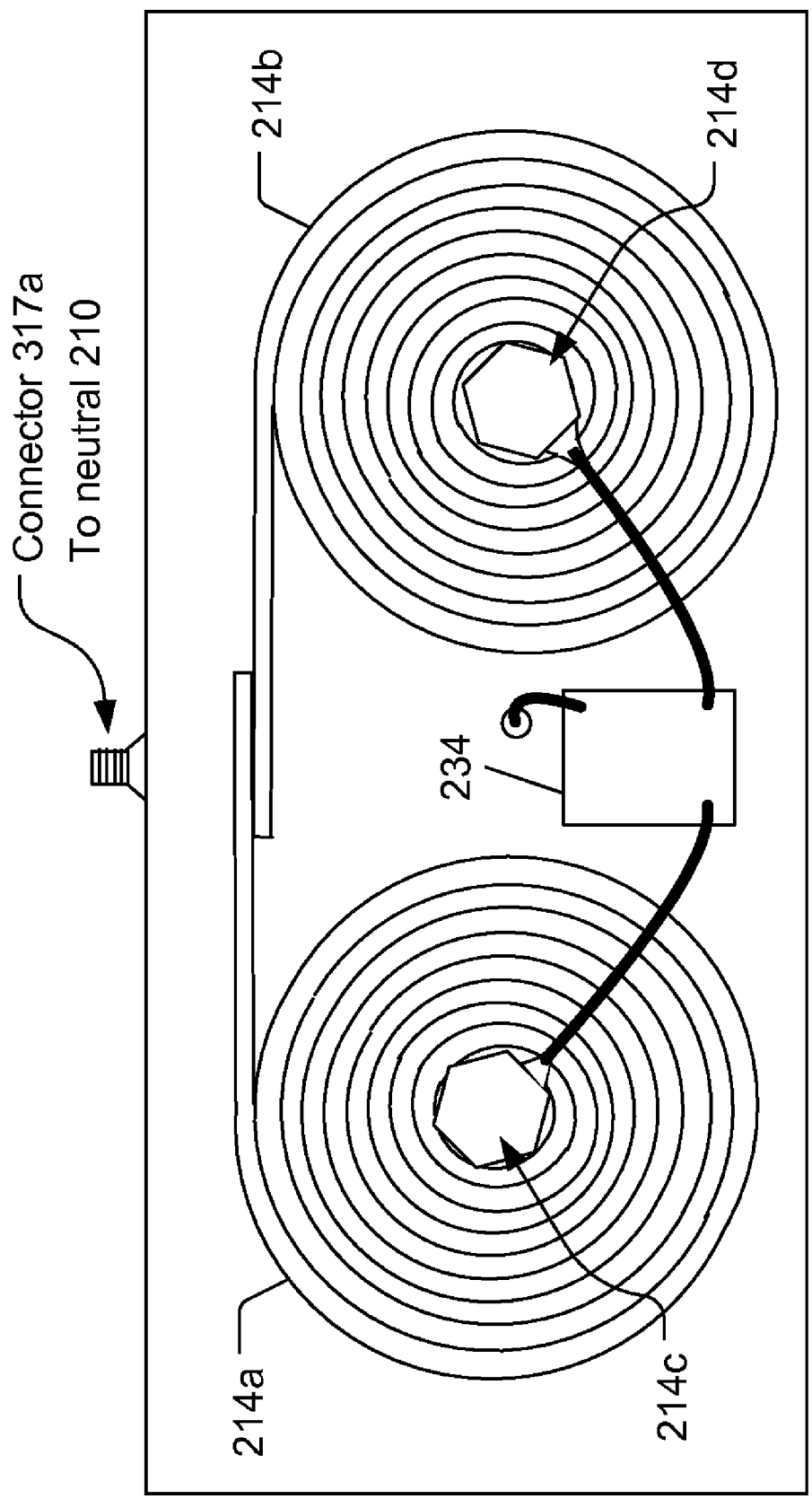

POWER LINE COUPLING DEVICE AND METHOD

FIELD OF THE INVENTION

The present invention generally relates to power line communication devices and methods, and more particularly to a device and method for coupling a broadband power line communication device to an overhead medium voltage power line.

BACKGROUND OF THE INVENTION

The need for reliable broadband communication networks to deliver data services such as voice over internet protocol (VoIP), video, internet web data, email, file sharing, stereo over IP, and other such services is increasing. In response to these demands, the communication infrastructure is expanding to include many types of communication networks beyond the public switched telephone network. A power line communication system (PLCS) is an example of a communication network in the expanding communication infrastructure.

A PLCS uses portions of the power system infrastructure to create a communication network. In addition to carrying power signals, existing power lines that run to and through many homes, buildings and offices, may carry data signals. These data signals are communicated on and off the power lines at various points, such as, for example, in or near homes, offices, Internet service providers, and the like.

There are many challenges to overcome when using power lines for data communication. For example, devices that communicate over power lines, such as medium voltage power lines, need a method of coupling data signals to and from the medium voltage power line. Medium voltage power lines can operate from about 1000 V to about 100 kV, and often carry high amperage. Consequently, coupling to a medium voltage power line gives rise to safety concerns for the user installing the coupling device.

The coupling device should be designed to provide safe and reliable communication of data signals with a medium voltage power line—carrying both low and high current—in all outdoor environments such as extreme heat, cold, humidity, rain, wind, high shock, and high vibration. Also, because many power line communication devices are connected to a low voltage power (and its associated coupler), the coupler must be designed to prevent that dangerous MV voltage levels from being provided to the customer premises on the low voltage power line. In addition, a coupling device should be designed so that it does not significantly compromise the signal-to-noise ratio or data transfer rate and facilitates bi-directional communication. In addition, the coupling device (or coupler as referred to herein) should enable the transmission and reception of broadband radio frequency (RF) signals used for data transmission in MV cables.

Finally, because a coupler may used throughout a PLCS, it must be economical to manufacture and easy to install by power line personnel. Various embodiments of the coupler of the present invention may provide many of the above features and overcome the disadvantages of the prior art.

SUMMARY OF THE INVENTION

The present invention provides a power line coupler for communicating data signals over a power distribution system having a first and second overhead energized medium voltage power line conductors. In one embodiment, the coupler includes a first lightening arrestor having a first end and a second end, wherein the first end of the first arrestor is connected to the first power line conductor. The coupler further includes a first high frequency impedance having a first end connected to the second end of the first lightening arrestor and the first impedance having a second end connected to a neutral conductor of the power line distribution system. The coupler may further include a second lightening arrestor having a first end and a second end, wherein the first end of the second arrestor is connected to the second power line conductor. The coupler further including a second high frequency impedance having a first end connected to the second end of the second lightening arrestor and a second end connected to the neutral conductor. The first high frequency impedance and the second high frequency impedance may each comprise an air core coil that forms an inductor. The coupler may further include a balun having a first winding and a second winding, wherein the first winding is coupled to a communication device, and wherein the second winding has a first end connected to the first end of the first high frequency impedance and a second end connected to the first end of the second high frequency impedance.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 8 illustrates an example configuration of two air core inductors and a balun according to an example embodiment of the present invention.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, power line communication systems (PLCS), software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, PLCSs, components, techniques, data and network protocols, software products and systems, operating systems, development interfaces, and hardware are omitted so as not to obscure the description of the present invention.

System Architecture and Power Line Communication System

Figure 1:
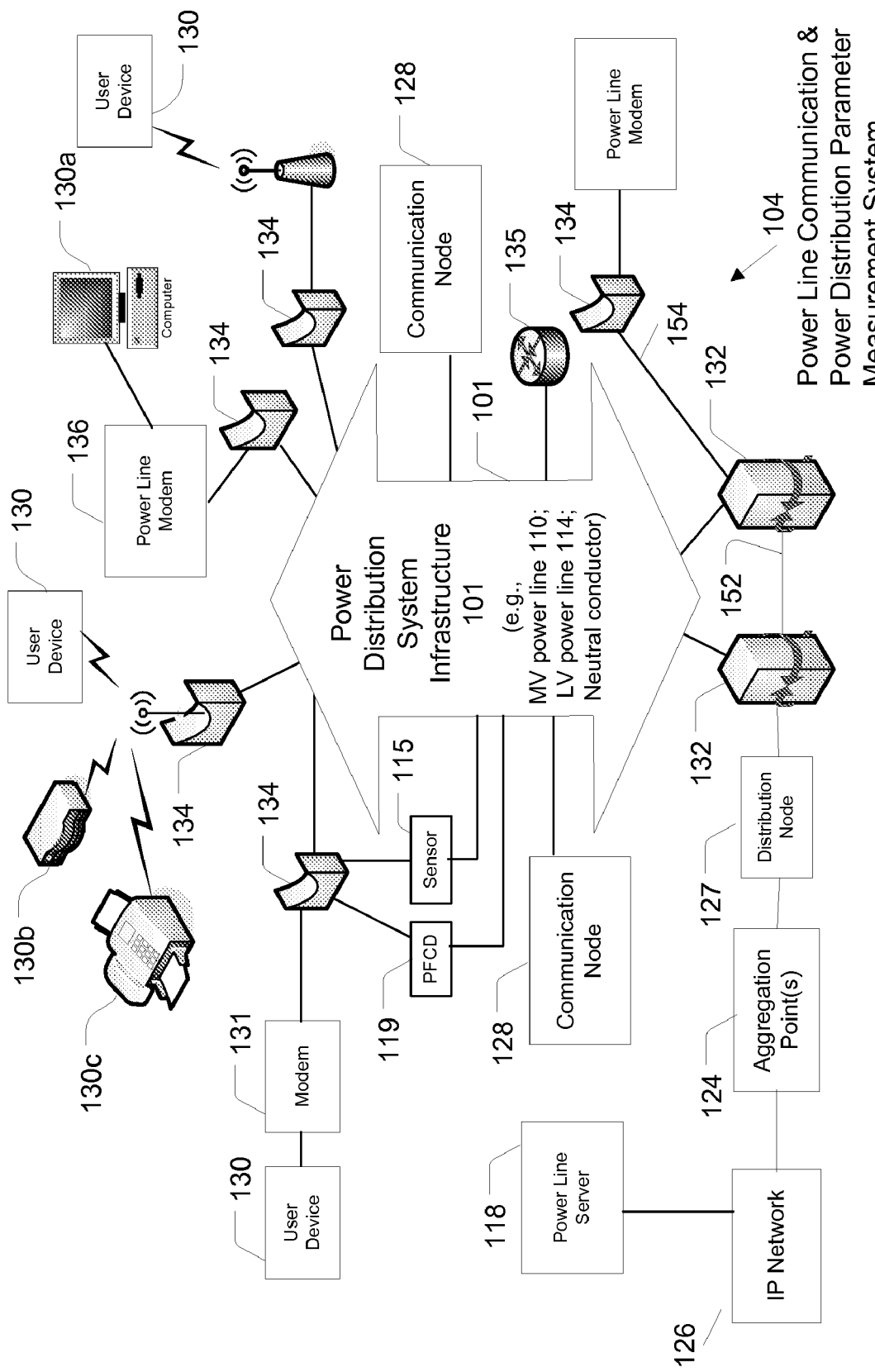
FIG. 1 is a block diagram of an example power line communication system.

FIG. 1 shows an example embodiment of a portion of a power line communication system (PLCS) 104. The PLCS 104 implements a communication network or sub-network using portions of the power system infrastructure 101 and various power line communication devices (PLCD) 138, 139, 135. The PLCD 138, 139, 135 may be coupled to power lines 110, 114 of the power system infrastructure 101 to transmit and receive communications.

The power distribution system infrastructure 101 includes power lines, transformers and other devices for power generation, power transmission, and power delivery. A power source generates power, which is transmitted along high voltage (HV) power lines for long distances. Typical voltages found on HV transmission lines range from 69 kilovolts (kV) to in excess of 800 kV. The power signals are stepped down to medium voltage (MV) power signals at regional substation transformers. MV power lines 110 carry power signals through neighborhoods and populated areas. Typical voltages found on MV power lines 110 power range from about 1000 V to about 100 kV. The power signals are stepped down further to low voltage (LV) levels at distribution transformers. LV power lines 114 typically carry power signals having voltages ranging from about 100 V to about 600 V. A distribution transformer may function to distribute one, two, three, or more phase voltages to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

The PLCS 104 may provide user services, such as high speed broadband internet access, mobile telephone communications, broadband communications, streaming video and audio services, and other communication services to homes, buildings and other structures such as to each room, office, apartment, or other unit of multi-unit structures. Communication services also may be provided to mobile and stationary devices in outdoor areas such as customer premises yards, parks, stadiums, and also to public and semi-public indoor areas such as subway trains, subway stations, train stations, airports, restaurants, public and private automobiles, bodies of water (e.g., rivers, bays, inlets, etc.), building lobbies, elevators, etc.

In various configurations the PLCS 104 may include one or more power line communication networks, such as an overhead power line communication network and/or an underground power line communication network. The PLCS 104 may include a plurality of communication nodes 128 which form communication links using power lines 110, 114 and other communication media. Various user devices 130 and power line communication devices (PLCD) 138, 139, 135 may transmit and receive data over the links (including power line links, wireless links, fiber optic links, etc.) to communicate via an IP network 126 (e.g., the Internet). Among the data may be user data, control data, and/or power distribution parameter data. A communication node 128 may comprise a backhaul node 132, an access node 134, or a repeater node 135. A given node 128 may serve as a backhaul node 132, access node 134, and/or repeater node 135. The various nodes may include respective power line communication devices. A PLCD may be coupled to an MV power line 110 and/or an LV power line 114.

Figure 2:
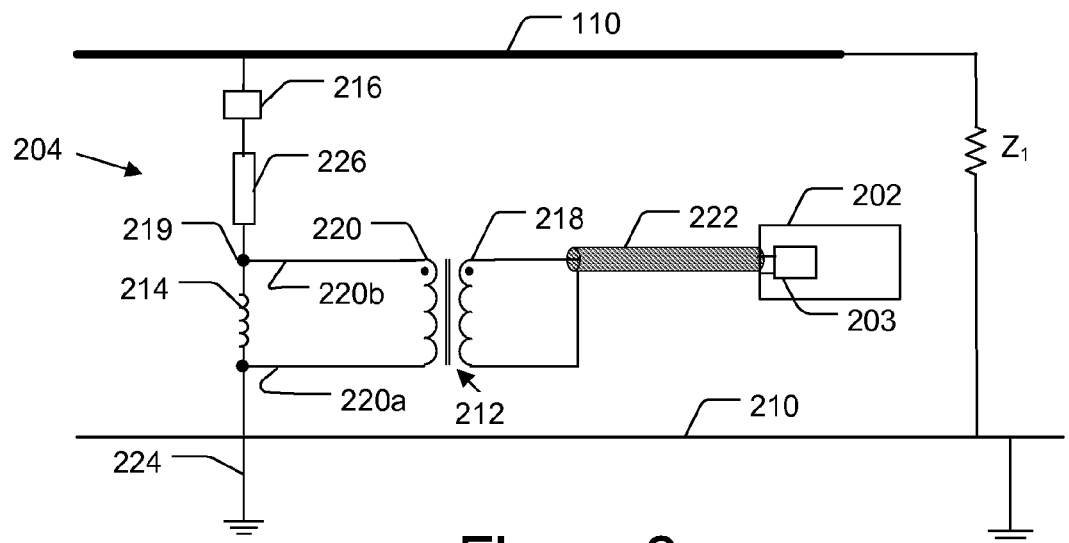
FIG. 2 is a schematic diagram of a coupling device according to an example embodiment of the present invention.

PLCD Coupler 202:

FIG. 2 shows a portion of a PLCS in which a power line communication device (PLCD) 202 is coupled to a single phase conductor 110 (which may form part of an overhead three-phase medium voltage (MV) power line) via a coupling device 204, according to an example embodiment of the present invention. The PLCD 202 illustrated in FIG. 2, and in the subsequent figures, may be any of the PLCD 138, 139, 135 described herein, and may include a modem or other transceiver device 203. The coupling device 204 may couple the PLCD 202 to the power line 110 at any point along the power line 110. In some embodiments the coupling may occur in the vicinity of a distribution transformer 112.

This example embodiment includes a lightening arrestor 216 (also known as a surge arrestor) coupled on its first side to the MV power line phase conductor 110 and on its second side to a first end of an air core inductor 214 via a conductor 226 (e.g., a length of wire) at node 219. The second end of the air core inductor 214 is connected to the neutral conductor 210 (which typically runs pole to pole in parallel with the MV power line 110) of the power distribution system, and which is also connected to earth ground via a ground conductor 224. The coupler 204 may also include a balun 212 having a first winding 220 and a second winding 218. Two terminals of the PLCD 202 may be coupled to the two ends of the second winding 218 of the balun 212 via a cable 222. A first end 220a of the first winding 220 of the balun 212 may be coupled to the neutral conductor 210 and the second end of the air core inductor 214. The second end 220b of the first winding 220 of the balun 212 may be coupled to the second end of the lightening arrestor 216 and the first end of the air core inductor 214 at node 219. As depicted, the second end 220b of the first winding 220 is coupled to the lightening arrestor 216 via a conductor 226 but, alternately may be directly connected to the arrestor 216 at node 219 (and to the air core inductor 214) without a conductor 226.

In summary, the transceiver 203 of the PLCD 202 may be coupled to both ends of the air core inductor 214 via the cable 222 and the balun 212. In other words, the air core inductor 214 may be connected in parallel with the first winding 220 of the balun 212. It is worth noting that the lightening arrestor 216 and air core inductor 215 are connected between the energized MV phase conductor 110 and the neutral conductor 210. Such placement provides several advantages. Specifically, the data signals are communicated differentially in that the difference in voltage between the two wires (the MV phase conductor 110 and the neutral conductor 210) is used to convey information. The phase conductor carries the power line communication signal, and the neutral conductor carries the inverse of the same signal. Thus, distant radiated noise sources tend to add the same amount of noise (called common-mode noise) to both wires, causing the voltage difference between the conductors to remain substantially unchanged due to such noise. Using such signaling method, the power line communication system embodiments may have a lower susceptibility to distant radiated noise than some other systems. In various embodiments, this embodiment of the coupler 204 may couple power line communications to one or more phases of a two phase, three phase or other multi-phase phase power line configuration systems.

The lightening arrestor 216 of the present example and others described herein provides a capacitance that allows the data signals to pass through the arrestor 216 while preventing the low frequency (60 Hz) high voltage power carried by the power line 110 from being conducted therethrough to the neutral 210. Thus, the lightening arrestor may be considered to be a high pass filter. One advantage of using a lightening arrestor is that they are already mass produced for utilities and, therefore, are relatively inexpensive compared to a custom designed capacitive device. Another advantage is that utility personnel are already familiar with installing them. In alternative embodiments, the lightening arrestor 216 of this and the other embodiments described herein may be replaced with a high voltage capacitor (e.g., a capacitive device or a metal oxide varistor device).

The air core inductor 214 provides an impedance to higher frequencies used to communicate data signals such as between 4 and 50 Megahertz but, (in this embodiment), is designed to allow electricity from a lightening strike to the MV power line conductor 110 to pass largely unimpeded. One example embodiment of the air core inductor 214 comprises a five micro-Henry air core inductor, which provides an impedance at frequencies used to communicate data signals, but that has very little impedance at frequencies often inherent in a lightening strike (e.g., 10 KHz). Hence, the air core inductor 214 may be considered a low pass filter. The impedance of the air core inductor 214 prevents higher frequency data signals received via the lightening arrestor 216 from being conducted directly to earth ground via conductor 224 and, instead, shunts the data signals through the first winding 220 of balun 218 to be received via second winding 218 by the modem 203 of PLCD 202. Likewise, when the PLCD 202 is transmitting data signals, the impedance of air core inductor 214 also prevents the data signals from canceling each other out at the first and second ends of the first winding 220 and instead, causes the data signals to be conducted to the MV phase conductor 110 (via lightening arrestor 216) and the neutral conductor 210 from the first winding 220. In other embodiments, instead of an air core inductor 214 the impedance (i.e., low pass filter) may be provided by other means such as by a ferrite core (or ferrite beads) placed around a conductor extending between the ends of the first winding 20 of the balun 212. However, the air core inductor may have advantages over various other means in that it is easy to construct, is light weight, and economical to manufacture. Air core inductor, as used herein, is meant to refer to an inductor having an inductance that is not substantially attributable to a magnetic material. In other words, the core of the inductor has a permeability approximating one and, therefore, may be formed of air, wood, fiber glass, copper, some types of steel, a dielectric, or other non-magnetic materials. Use of the air core inductor reduces the likelihood of saturation.

The air core inductor 214 may be implemented in either a multi-phase system or a single phase system. Very low 'through losses' may be achieved with the coupler 204 embodiments, which may be controlled by the balun 212. Specifically, in some embodiments, by increasing the input impedance of the balun 212 (from the first winding 220) may reduce the through loss (i.e., the reduction in energy) of signals that traverse the MV phase conductor 110 past the lightening arrestor 216.

One advantage of the coupler 204 is its compatibility with various power line cables and systems, including for example, 15, 25 and 35 kV cables and systems. Another advantage of the coupler 204 is that it can be installed without interrupting power line service, (i.e., no-outage installation).

In an example transmission method, a communication signal is transmitted over the MV power line 110 from PLCD 202. The communication signal is transmitted from the modem 203 of PLCD 202 to the second winding 218 of balun 212. The communication signal is induced onto the first winding 220. The air core inductor 214 has an impedance that directs the energy of the signal away from the inductor 214, allowing the signal to be applied differentially to the energized phase conductor 110 (via the lightening arrestor 216) and the neutral conductor 210. Thus, the signal may be transmitted differentially onto the phase conductor 110 and the neutral conductor 210, and received by another PLCD 202. In addition, in some embodiments the signals also may cross couple from one phase conductor 110 to another phase conductors 110 (not shown) through air. Thus, the transmitting PLCD 202 may be coupled to one conductor 110, while the receiving PLCD 202 may be coupled to the same conductor 110 or to a different conductor 110. At the receiving PLCD 202, the difference between the signals on two of the conductors—the MV phase conductor 110 and the neutral conductor—may be detected. Because the PLCD 202 ignores the conductors' voltages with respect to ground, small changes in ground potential from the transmitting PLCD 202 and receiving PLCD 202 generally do not affect the receiving PLCD's ability to detect the signal.

For a received signal, the communication signal may be received at the lightening arrestor, which conducts the high frequency signal to the first winding 220 of the balun 212 first, which induces the signal onto the second winding 218, which is then detected at the PLCD 202. The inverse of the signal may also be received via the neutral conductor 210 and received at the second end 220a of the first winding 220. The impedance of the air core inductor 214 causes the current of the two signals to flow through the first winding 220 of the balun 212 instead through the inductor 214 to cancel each other out. The use of the inductor 214 in this embodiment (and in the others) allows the lightening arrestor to simultaneously operate as both part of the coupling device and as a lightening arrestor to afford the utility infrastructure (e.g., a transformer) protection (because the air core inductor 214 will conduct the electricity of a lightening strike). The dual functionality of some embodiments of the present invention may thus be well suited for some implementations of power line communication systems that include a coupling device at or near each transformer (as part of a bypass device to bypass data signals around the transformer).

Figure 3A:
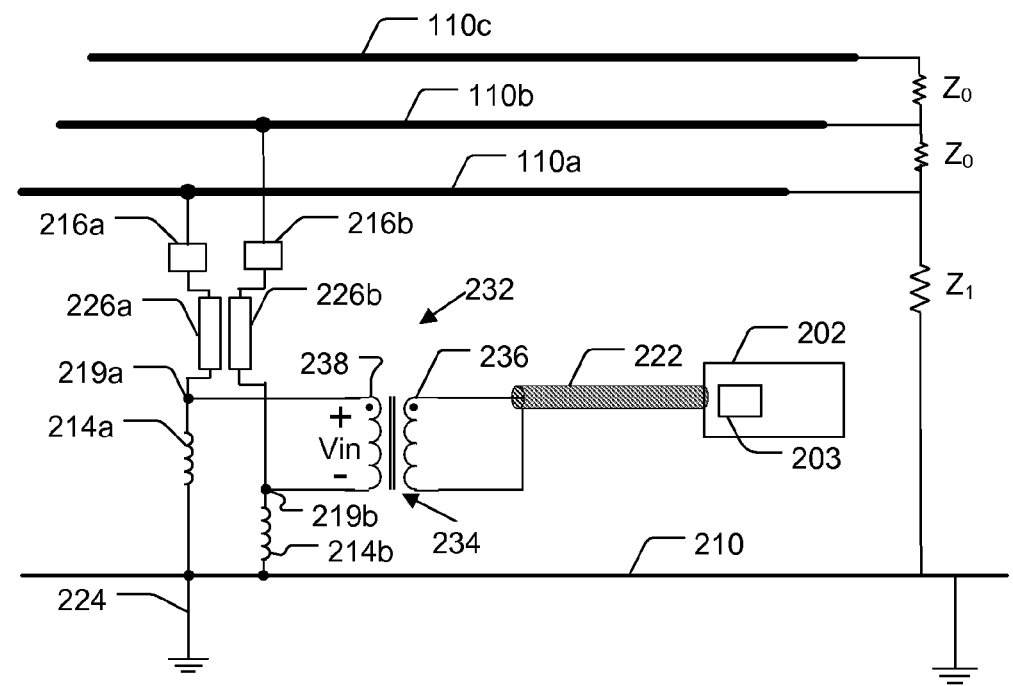
FIG. 3a is a schematic diagram of a coupling device according to another example embodiment of the present invention.

FIG. 3a shows a portion of a PLCS in which a power line communication device (PLCD) 202 is coupled to a multi-phase medium voltage (MV) power line 110 via a coupling device 232, according to another example embodiment of the present invention. Communications may be transmitted differentially over two MV power line phase conductors 110a, 110b to and from the PLCD 202. The coupling device 232 may include a balun 234, a pair of air core inductors 214a,b, and a pair of lightening arrestors 216a,b.

In the embodiment of FIG. 3a, a first air core inductor 214a may be coupled to a first lightening arrestor 216a (via a conductor 226a) between a first energized conductor 110a and the neutral conductor 210. Similarly, a second air core inductor 214b may be coupled to a second lightening arrestor 216b (via conductor 226b) between a second energized conductor 110b and the neutral conductor 210. The balun 234 has a first winding 238 and a second winding 236. One end of the first winding 238 may be coupled to a first node 219a to which is connected to both the first air core inductor 214a and the first lightening arrestor's 216a. Similarly, the second end of the first winding 238 may be coupled to node 219b to which is connected both the second air core inductor 214b and the second lightening arrestor's 216b. As previously described, the lightening arrestors 216 may be replaced with other capacitive devices (e.g., a high voltage capacitor or a metal oxide varistor device). The two ends of the second winding 236 may be coupled to two terminals of the PLCD 202, such as via a cable 222. As depicted in FIG. 3a, conductors 226a and 226b, which each may comprise a length of copper wire, may be disposed along side of each other to form a two wire transmission line and thereby improve communications (e.g., by reducing radiated emissions from the coupler 232).

In the embodiment of FIG. 3a, the data signals are transmitted differentially over two phase conductors of a multi-phase power line (e.g., two phase or three phase). In this embodiment, the air core inductors 214a,b again provide an impedance to higher frequencies used to communicate data signals. Consequently, during transmission the air core inductors 214 prevent the data signals from being conducted to the neutral conductor and, instead, cause the data signals to be conducted through the lightening arrestors 216a, b onto the two phase conductors 110a,b. For reception, the air core inductors 214 prevent the data signals from being conducted to the neutral conductor 210, but, instead, cause the data signals to be conducted from the lightening arrestors 216, through the balun 234, to the PLCD 202. In addition, the air core inductors 214 have a very low impedance for frequencies often associated with lightening to thereby permit the current from a lightening strike on one of the MV conductors 110a,b to be conducted to ground (via ground conductor 214) largely unimpeded.

Figure 3B:
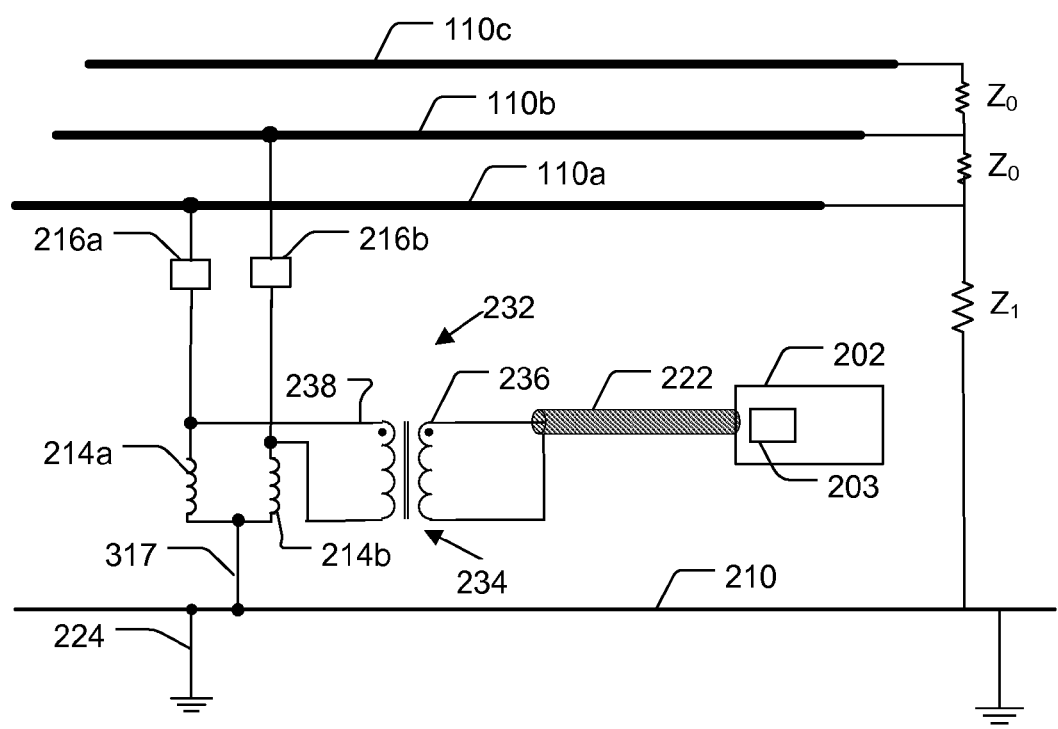
FIG. 3b is a schematic diagram of a coupling device according to yet another example embodiment of the present invention.

In another embodiment illustrated in FIG. 3b, the first air core inductor 214a and 214b are connected to each other on their second ends, and are also connected to the neutral conductor 210 by a common conductor 317 (instead of via separate conductors as shown in FIG. 3a). In addition, in this embodiment, the air core inductors 214 may be physically positioned adjacent the lightening arrestors 216a,b on a utility pole so that the conductors 226 may not be present or, if present, may not form a two pair transmission line.

In some embodiments multiple phase conductors may not be available for implementing a differential communication method. In such cases or in any case where communication is desired to be implemented on a single conductor, the communication signal may be injected at two separate locations along the phase conductor.

Figure 4:
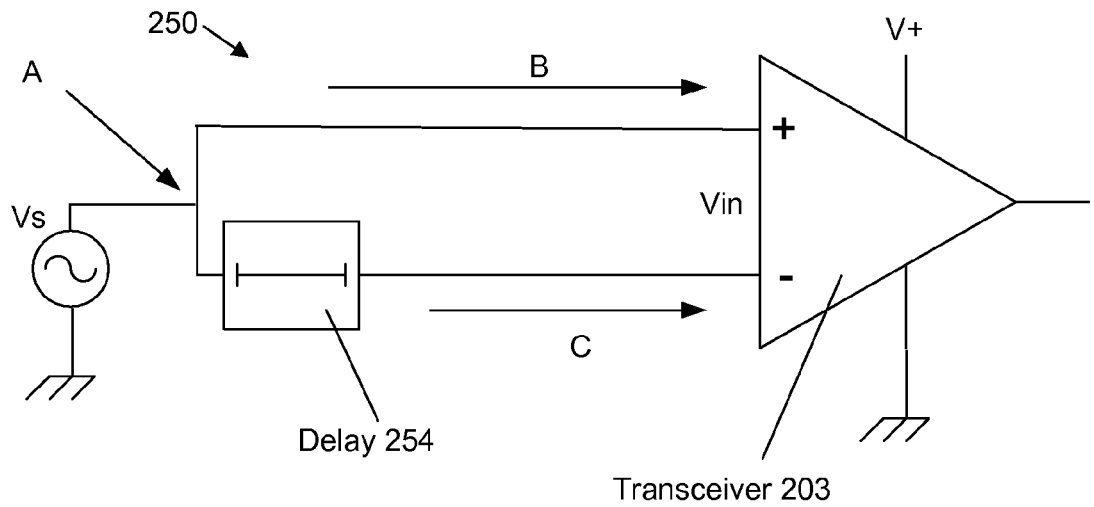
FIG. 4 is a schematic diagram depicting principles of phase differential communication practiced by some example embodiments of the present invention.

FIG. 4 shows a circuit 250 used to illustrate the principles of differential communication for such examples. Data signals (depicted as source Vs) split at point A and traverse along paths B and C toward transceiver 203 (whose gain equals one for the purposes of this description). The two paths B and C may be the same, except that path C may include an additional delay 25 of time duration T1 that delays the arrival of the signal Vs at the negative input terminal of the transceiver 203. (Note: Vs generally refers to the peak voltage of the voltage source, as opposed to the peak to peak voltage.) Thus, the signal Vs will arrive at the positive terminal of the transceiver 203 at time T1 before the signal Vs arrives at the negative terminal of the receiver. If the delay 25 causes a delay of time T1 that is substantially equal to one half of the period of a carrier signal modulated by the data signal, the transceiver 203 will see a voltage difference between its positive and negative terminals, and deliver an output voltage, that approximates twice Vs. Alternately, if the delay 25 causes a delay of time T1 that is substantially equal to one quarter of the period of the carrier signal modulated by the data signal, the transceiver 90 will deliver an output voltage that approximates Vs multiplied by the square root of two.

One method of causing a delay 25 along path C may be to increase the distance that the signal must travel to reach the transceiver 203. One method of purposely implementing such a delay is to construct path C to be longer than path B by a distance equal to the portion of the wavelength for which a delay is desired. Thus, data from a single common source location may be transmitted and traverse two data paths on route to a common receiving location. A delay may be added to one path with a receiving device differentially receiving the signal from the two paths. If the delay for a given signal along one path is not ideal (e.g., is much less than the period), the differential voltage at the transceiver terminals may be smaller than Vs thereby resulting in an apparent coupling loss. However, depending on numerous factors some coupling loss may be tolerable or even desirable.

Figure 5:
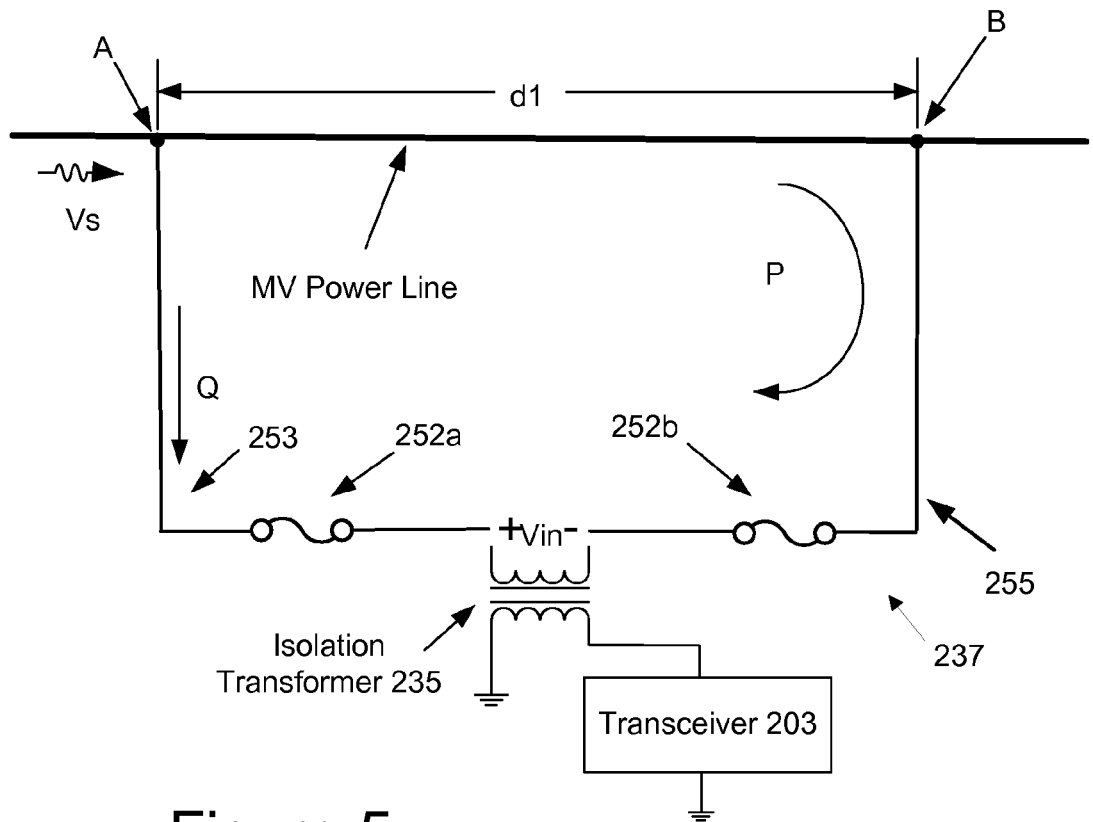
FIG. 5 is another schematic diagram depicting principles of phase differential communication practiced by some example embodiments of the present invention.

Referring to FIG. 5, the data signals (Vs) are transmitted along the MV power line from the left, as indicated by the arrow Vs. As the data signals Vs traverse the power line, different locations on the power line may be at different voltage potentials due to the changing phase of the data signal. In this example embodiment, the energy of the data signal will propagate down the power line toward point A. In this example, point A is a first connection point. At point A, a portion of the energy of the data signal will propagate along path Q and conductor 253 to the positive terminal of an isolation transformer 235. In addition, a second portion of the energy of the data signal will continue propagating down the power line until reaching point B. In this example, point B is a second connection point to the power line 110. At point B, a portion of the remaining energy of the data signal will propagate along path P and conductor 255 to the negative terminal of isolation transformer 235. Also, note that a third portion of the energy of the data signal may be reflected back by the real and present impedance discontinuity created by the junction at point B. This reflected power may contribute to both the insertion loss and through loss of a coupler 237, because none of that power reaches the transceiver 203, nor travels past the coupler 237.

As illustrated in FIG. 5, the data signals traversing along path P must traverse a longer distance to reach the isolation transformer 235 than the data signals traveling along path A. In this example embodiment the path distance between the isolation transformer 235 and point A may equal the path distance between the isolation transformer 235 and point B. Consequently, the additional distance that the data signals traverse along path P may substantially equal the distance d1 between connections points A and B along the power line. Thus, in this embodiment, the closer that the distance between points A and B approximates one-half a wavelength of the carrier signal used to communicate the data signals, the closer the received signal will be to approximating twice Vs (i.e., twice Vs that exists at connection point A). As will be evident to those skilled in the art, Vs at point A may be less than the voltage transmitted from the transmitter due to the attenuation of the signal prior to it reaching point A.

The current from the data signals reaching the isolation transformer 235 at the primary winding will induce a voltage (Vin) across the secondary winding that corresponds to the data signal. Such corresponding signal may then be received and processed by the transceiver 203. In this embodiment, fuses 252a, 252b may be included to ensure safety of personnel in the event a fault occurs.

For data signals originating at the transceiver 203, the data signals are transmitted to the isolation transformer 235 resulting in a differential voltage Vin on the primary winding. The voltage Vin is conducted to the power line at connection points A and B. A portion of the power of the data signals may be transmitted in both directions on the power line away from the coupler 237. Specifically, when the data signal from path P reaches point B, it will be travel in both directions along the MV power line. When a portion of that energy reaches point A, it will be added to the energy of the data signals that reach point A by traveling along path Q. However, because the data signal that traverses path P was transmitted with substantially the same magnitude and with opposite polarity (differentially) and has traveled a greater distance to reach point A, its energy will not "cancel out" the data signals from path Q, but instead may increase the energy of the data signals traveling upstream (e.g., to the left in the figure).

In this example embodiment the excess distance that the transmitted data signal travels along path P to reach point A, in comparison to the distance traveled along path Q to reach point A, may substantially equal the distance d1 along the power line between points A and B. Accordingly, the more precisely that the distance between points A and B (or more exactly A+B+P−Q) approximates one-half the wavelength of the carrier signal used to communicate the data signals, the closer the transmitted signal (at point A) may approximate twice Vin (i.e., twice Vin transmitted by isolation transformer 235). In a system that uses multiple carrier frequencies, the distance between points A and B may approximate one-half the wavelength of any of the carrier frequencies. As will be evident those skilled in the art, transmission and reception of data signals to and from the other direction on the power line will operate in substantially the same manner.

In some instances, depending on the frequencies used to communicate the data signals, a half (or even quarter) of a wavelength may be too great a distance to make the coupler economically feasible or to permit a practical installation. In other embodiments, depending on various factors, including but not limited to the quantity of power line noise, the transceiver 203 sensitivity, and the power of the data signals, it may be possible to make the distance between the connection points A and B less than one half or one quarter of a wavelength. In one example embodiment, the distance between the two connection point locations on the MV power (points A and B) preferably may be greater than five percent (5%), more preferably greater than seven and a half percent (7.5%), even more preferably greater than ten percent (10%), and still more preferably greater than twenty percent (20%) of the wavelength of a carrier frequency or of the lowest carrier frequency used to communicate the data signals. As is known to those skilled in the art, the wavelength is equal to the speed of propagation of the wave (which may approximate the speed of light) divided by its frequency. Thus, for data signals transmitted using carrier signals in the 30-50 Mhz band, the distance between the two connection points may preferably be greater than five percent (5%), more preferably greater than seven and a half percent (7.5%), even more preferably greater than ten percent (10%), and still more preferably greater than twenty percent (20%) of the wavelength of the 30 Mhz carrier signal (i.e., the lowest carrier frequency). Because the 30 Mhz carrier signal has a wavelength of less than 394 inches on the MV wire, the distance between the two connection points may preferably be greater than 19.6 inches (5%), more preferably greater than 29.4 inches (7.5%), even more preferably greater than 39.2 inches (10%), and still more preferably greater than 78.4 inches (20%). It will be recognized to those skilled in the art that if the frequency band of carriers is very wide, in comparison to the lowest carrier frequency, it may be desirable to set the distance between the connection points to be a quarter of a wavelength of a carrier near the middle of the frequency band.

Figure 6:
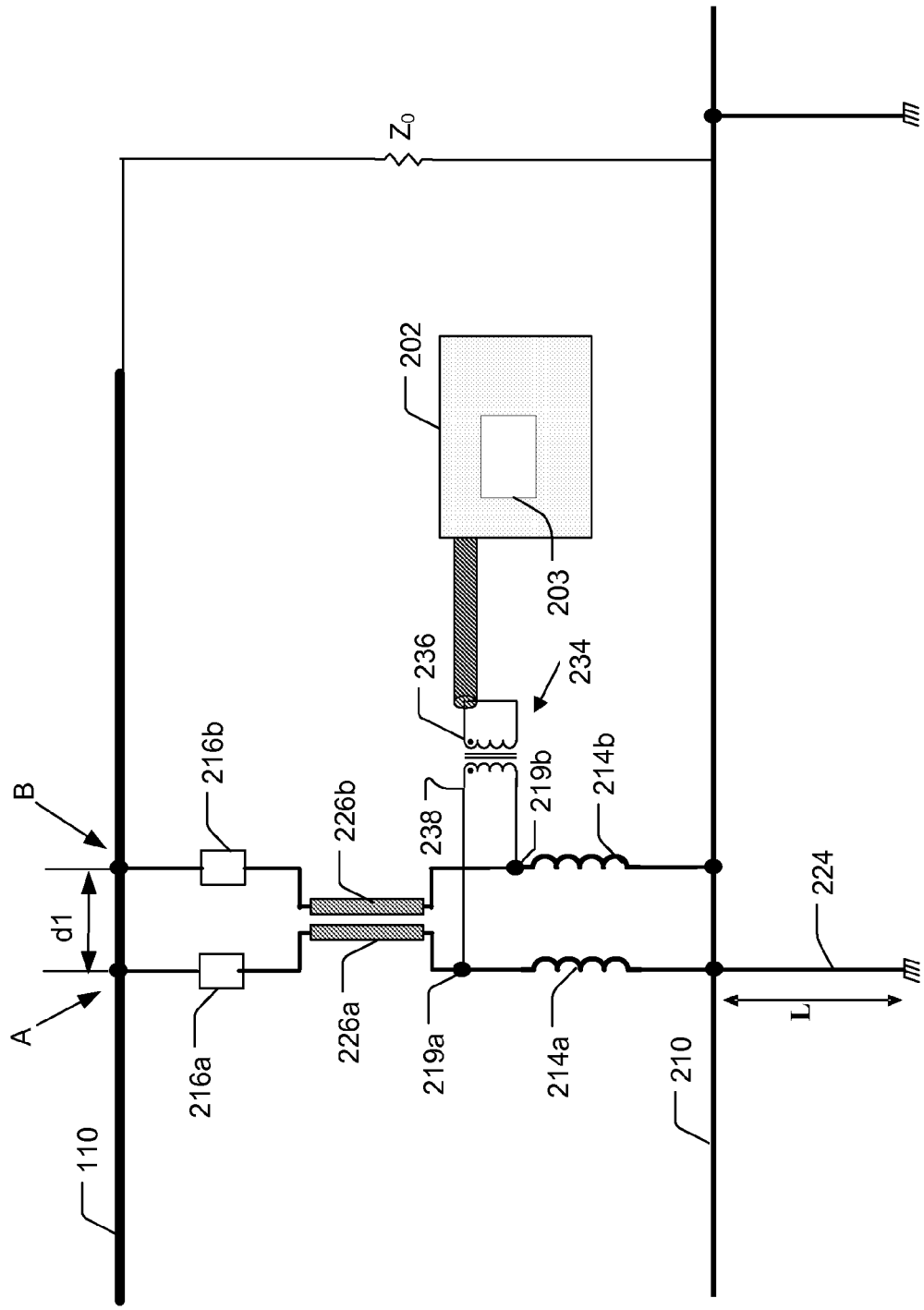
FIG. 6 is a schematic diagram of a coupling device according to another example embodiment of the present invention.

FIG. 6 shows a portion 260 of a PLCS in which a power line communication device (PLCD) 202 is coupled to a single MV phase conductor 110 via the coupling device, according to another example embodiment of the present invention. This embodiment of the coupling device may include the same components as the coupling device of FIG. 3a. In particular, the coupling device may include a balun 234, a pair of lightening arrestors 216, and a pair of air core inductors 214a,b (or other high frequency impedance devices).

In the embodiment of FIG. 6, a first air core inductor 214a may be coupled to a first lightening arrestor 216a (via a conductor 226a) between the energized conductor 110 and the neutral conductor 210. Similarly, a second air core inductor 214b may be coupled to a second lightening arrestor 216b (via conductor 226b) the energized conductor 110 and the neutral conductor 210. The balun 234 has a first winding 238 and a second winding 236. One end of the first winding 238 may be coupled to node 219a to which is connected to both the first air core inductor 214a and the first lightening arrestor's 216a. Similarly, the second end of the first winding 238 may be coupled to node 219b to which is connected both the second air core inductor 214b and the second lightening arrestor's 216b. In this embodiment, the air core inductors 214a and 214b are connected to the neutral conductor on their second ends via separate conductors. This embodiment also includes the two wire transmission line formed by conductors 226. Alternately, the two air core inductors 214 could be connected to the neutral conductor 21 via a common conductor as illustrated in FIG. 3b. In such an alternate embodiment, the air core inductors 214 may be physically positioned adjacent the lightening arrestors 216a,b so that the conductors 226 may not be present or, if present, may not form a two pair transmission line.

The air core inductors 214 that form the high frequency impedances described above may be implemented in various embodiments. For example, in one embodiment, the air core inductors comprise an air core coil in the shape of a spiral that is formed of copper wire. Each loop of the spiral conductor may be insulated from other loops by a dielectric. The copper wire may have a rectangular cross section to thereby decrease the overall size of the inductor for a given inductance and DC current handling capability. The high frequency impedances of other embodiments of the coupler may be formed with other types of inductors and/or other low pass filters such as, for example, a copper wire that is looped one or more times through the center of a magnetically permeable toroid (e.g., a ferrite toroid).

Figure 7:
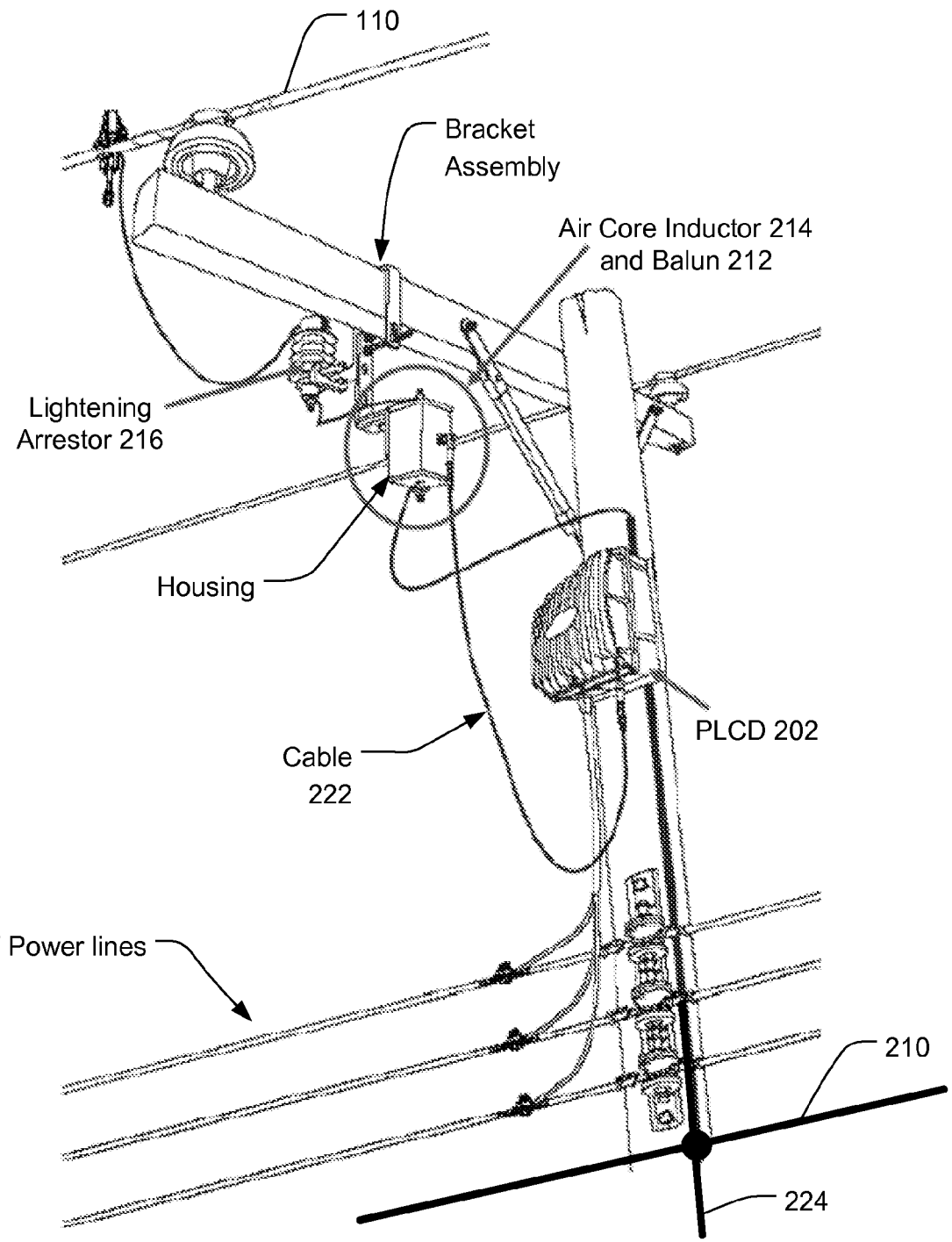
FIG. 7 illustrates an example implementation of a coupling device according to an example embodiment of the present invention.

FIG. 7 illustrates an example implementation of a single phase coupler similar to the embodiment shown in FIG. 2. In this embodiment, the air core inductor 214 and the balun 212 are housed inside a housing that is attached to a bracket assembly. In addition, the lightening arrestor 216 is also attached to the bracket assembly so that mounting of the bracket assembly provides the physical installation of the components of the coupler. In a multiphase coupler, two air core inductors 214 may be disposed in the housing and two arrestors may be attached to the bracket assembly. For example, FIG. 8 illustrates the configuration of two air core inductors 214a,b that are to be mounted inside such a housing. As illustrated, the two air core inductors 214 of this embodiment are formed of a copper conductor having spiral configuration. The first ends (214c and 214d) of each air core inductor 214a,b are connected to the balun 234 and also connected to the second ends of the lightening arrestors (not shown) via bolt that extends through the housing and is exposed on the opposite site of the housing. The second ends of the air core conductors are connected together and also connected to connector 317a, which is to be connected to conductor 317 (shown in FIG. 3b), which connects to the neutral conductor 210. Other implementations and configurations for mounting the coupler and housing the components are within the scope of the present invention.

Communication Links and Communication Nodes

The power line communication system 104 (see FIG. 1) may include communication links formed between communication nodes 128 over a communication medium. Some links may be formed over the MV power lines 110. Some links may be formed over LV power lines 114. Other links may be gigabit-Ethernet links 152, 154 formed, for example, using a fiber optic cable. Thus, some links may be formed using a portion 101 of the power system infrastructure, while other links may be formed over another communication media, (e.g., a coaxial cable, a T-1 line, a fiber optic cable, wirelessly (e.g., IEEE 802.11a/b/g, 802.16, 1G, 2G, 3G, or satellite such as WildBlue®)). The links formed by wired or wireless media may occur at any point along a communication path between a backhaul node 132 and a user device 130.

Each communication node 128 may be formed by one or more communication devices. Communication nodes which communicate over a power line medium include a power line communication device (PLCD). Exemplary PLCD include a backhaul device 138, an access device 139, and a repeater. Communication nodes which communicate wirelessly may include a mobile telephone cell site or a wireless access point having at least a wireless transceiver. Communication nodes which communicate over a coaxial cable may include a cable modem. Communication nodes which communicate over a twisted pair wire may include a DSL modem or other modem. A given communication node typically will communicate in two directions (either full duplex or half duplex), which may be over the same or different types of communication media. Accordingly, a communication node 128 may include one, two or more communication devices.

A backhaul node 132 may serve as an interface between a power line portion (e.g., an MV power line 110) of the system 104 and an upstream node, which may be, for example, an aggregation point 124 that may provide a connection to an IP network 126. The backhaul node 132 may communicate with its upstream device via any of several alternative communication media, such as a fiber optic (digital or analog (e.g., Wave Division Multiplexed), coaxial cable, WiMAX, IEEE, 802.11, twisted pair and/or another wired or wireless media. Downstream communications from the IP network 126 typically are communicated through the aggregation point 124 to the backhaul node 132. The aggregation point 124 typically includes an Internet Protocol (IP) network data packet router and is connected to an IP network backbone, thereby providing access to an IP network 126 (i.e., can be connected to or form part of a point of presence or POP). Any available mechanism may be used to link the aggregation point 124 to the POP or other device (e.g., fiber optic conductors, T-carrier, Synchronous Optical Network (SONET), and wireless techniques). Thus, a backhaul node may include a first modem for communicating over a fiber optic conductor, a second modem for communicating over an MV power line, a third modem for communicating with one or more user devices such as over a low voltage power line or wirelessly. In addition, a backhaul node may include a processor and a routing device (e.g., router, bridge, switch, etc.) to control the destination of received data packets.

An access node 134 may serve one or more user devices 130 or other network destinations. Upstream data may be sent, for example, from a user device 130 to an access node 134. Other data also, such as power line parameter data (e.g., from parameter sensing devices) may be received by an access node's power line communication device 139. The data enters the network 104 along a communication medium coupled to an access node 134. The data is routed through the network 104 to a backhaul node 132, (or a local destination, such as another user device 130). Downstream data is sent through the network 104 to a user device 130. Thus, an access node may include a first for communicating over an MV power line (via a coupler), a second modem for communicating with one or more user devices such as over a low voltage power line or wirelessly. In addition, an access node may include a processor and a routing device (e.g., router, bridge, switch, etc.) to control the destination of received data packets.

Exemplary user devices 130 include a computer 130a, LAN, a WLAN, router 130b, Voice-over IP endpoint, game system, personal digital assistant (PDA), mobile telephone, digital cable box, power meter, gas meter, water meter, security system, alarm system (e.g., fire, smoke, carbon dioxide, security/burglar, etc.), stereo system, television, fax machine 130c, HomePlug residential network, or other device having a data interface. A user device 130 may include or be coupled to a modem to communicate with a given access node 134. Exemplary modems include a power line modem 136, a wireless modem 131, a cable modem, a DSL modem or other suitable transceiver device.

A repeater node 135 may receive and re-transmit data (i.e., repeat), for example, to extend the communications range of other communication elements. As a communication traverses the communication network 104, backhaul nodes 132 and access nodes 134 also may serve as repeater nodes 135, (e.g., for other access nodes and other backhaul nodes 132). Repeaters may also be stand-alone devices without additional functionality. Repeaters 135 may be coupled to and repeat data on MV power lines or LV power lines (and, for the latter, be coupled to the internal or external LV power lines).

Communication nodes which access a link over a wireless medium may include a wireless access point having at least a wireless transceiver or a mobile telephone cell site (e.g., a micro or pico cell site). Communication nodes which access a link over a coaxial cable may include a cable modem. Communication nodes which access a link over a T-1 wire may include a DSL modem. According to an embodiment of a power line communication device, a backhaul device 138 or access device 139 or repeater may establish links over MV power lines 110, LV power lines 114, wired media, and wireless media. Accordingly, a given communication node may communicate along two or more directions establishing multiple communication links, which may be formed along the same or different types of communication media.

The communication nodes with which the coupling devices of the present invention are used may be configured to determine when a lightening arrestor 216 that is forming part of the coupling device has been blown, which, for example, may be caused by a lightening strike. For example, if communications with a particular PLCD are no longer possible from other PLCDs, the arrestor 216 may be faulted. Different arrestors may fault differently. Consequently, communications may remain possible with some other arrestors even after the arrestor is blown due to a lightening strike. In such causes, the electrical characteristics (e.g., the capacitance and/or resistance) of the faulted lightening arrestor may be different from the characteristics of the arrestor before it was blown. The change in the characteristics may cause a change in the transfer function of the arrestor for frequencies of communications, which in turn may cause an increase in insertion loss and a reduction bandwidth. Detection of a blown lightening arrestor by a PLCD may result in transmission of a notification by the PLCD to its upstream device, through the internet, to a remote computer system, which stores information of the location (e.g., pole number) of the blown arrestor in order to dispatch crews to replace the arrestor.

The couplers of the present invention may also be used with existing arrestors that are already installed. For example, one process may comprise identifying installed arrestors and installing the air core inductor, balun, and PLCD.

Network Communication Protocols:

The communication network 104 may provide high speed internet access and other high data-rate data services to user devices, homes, buildings and other structure, and to each room, office, apartment, or other unit or sub-unit of multi-unit structure. In doing so, a communication link is formed between two communication nodes 128 over a communication medium. Some links are formed by using a portion 101 of the power system infrastructure. Specifically, some links are formed over MV power lines 110, and other links are formed over LV power lines 114. Still other links may be formed over another communication media, (e.g., a coaxial cable, a T-1 line, a fiber optic cable, wirelessly (e.g., IEEE 802.11a/b/g, 802.16, 1G, 2G, 3G, or satellite such as WildBlue®)). Some links may comprise wired Ethernet, multipoint microwave distribution system (MMDS) standards, DOCSIS (Data Over Cable System Interface Specification) signal standards or another suitable communication method. The wireless links may also use any suitable frequency band. In one example, frequency bands are used that are selected from among ranges of licensed frequency bands (e.g., 6 GHz, 11 GHz, 18 GHz, 23 GHz, 24 GHz, 28 GHz, or 38 GHz band) and unlicensed frequency bands (e.g., 900 MHz, 2.4 GHz, 5.8 GHz, 24 GHz, 38 GHz, or 60 GHz (i.e., 57-64 GHz)).

Accordingly, the communication network 104 includes links that may be formed by power lines, non-power line wired media, and wireless media. The links may occur at any point along a communication path between a backhaul node 132 and a user device 130, or between a backhaul node 132 and a distribution point 127 or aggregation point 124.

Communication among nodes 128 may occur using a variety of protocols and media. In one example, the nodes 128 may use time division multiplexing and implement one or more layers of the 7 layer open systems interconnection (OSI) model. For example, at the layer 3 'network' level, the devices and software may implement switching and routing technologies, and create logical paths, known as virtual circuits, for transmitting data from node to node. Similarly, error handling, congestion control and packet sequencing can be performed at Layer 3. In one example embodiment, Layer 2 'data link' activities include encoding and decoding data packets and handling errors of the 'physical' layer 1, along with flow control and frame synchronization. The configuration of the various communication nodes may vary. For example, the nodes coupled to power lines may include a modem that is substantially compatible with the HomePlug 1.0 or A/V standard. In various embodiments, the communications among nodes may be time division multiple access or frequency division multiple access.

Examples of access devices 139, backhaul points 138, repeaters 158, power line servers, and other components are provided in U.S. Pat. No. 7,224,272, issued May 29, 2007, entitled "Power Line Repeater System and Method," which is hereby incorporated by reference in its entirety. A detailed description of other such devices is provided in U.S. patent application Ser. No. 11/423,206 filed Jun. 9, 2006, entitled "Power Line Communication Device and Method," which is hereby incorporated by reference in its entirety.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A power line coupler configured to couple communication signals between a communication device having a first terminal and a second terminal and a power distribution system having a first and a second overhead energized power line conductor, and a neutral conductor, comprising:
   a first capacitor having a first end and a second end;
   wherein said first end of said first capacitor is connected to the first power line conductor;
   a second capacitor having a first end and a second end;
   wherein said first end of said second capacitor is connected to the second power line conductor;
   a transformer forming at least part of a balun and having a first winding and a second winding;
   wherein said first winding has a first end coupled to the first terminal of the communication device;
   wherein said first winding has a second end coupled to the second terminal of the communication device;
   wherein said second winding has a first end coupled to said second end of said first capacitor; and
   wherein said second winding has a second end coupled to said second end of said second capacitor.

2. The coupler of claim 1, further comprising:
   a first high frequency impedance having a first end connected to said second end of said first capacitor, said first high frequency impedance having a second end connected to the neutral conductor;
   a second high frequency impedance having a first end connected to said second end of said second capacitor, said second high frequency impedance having a second end connected to the neutral conductor.

3. The coupler of claim 2, wherein said second end of said first impedance and said second end of said second impedance are connected to the neutral conductor via a common conductor.

4. The coupler of claim 3, wherein said first capacitor comprises a first lightening arrestor and said second capacitor comprises a second lightening arrestor.

5. The coupler of claim 2, wherein said first high frequency impedance and said second high frequency impedance each comprise an air core inductor.

6. The coupler of claim 5, wherein said first capacitor comprises a first lightening arrestor and said second capacitor comprises a second lightening arrestor.

7. The coupler of claim 2, wherein said first high frequency impedance and said second high frequency impedance each comprises a spiral conductor.

8. The coupler of claim 2, wherein said first capacitor comprises a first lightening arrestor and said second capacitor comprises a second lightening arrestor.

9. The coupler of claim 2, wherein:
said first end of said first high frequency impedance is connected to said second end of said second capacitor via a first conductor;
said first end of said second high frequency impedance is connected to said second end of said second capacitor via a second conductor; and
said first conductor and said second conductor form a two wire transmission line.

10. The coupler of claim 1, wherein said first capacitor comprises a first lightening arrestor and said second capacitor comprises a second lightening arrestor.

11. A power line coupler configured to couple communication signals to and from a power distribution system having a first and a second overhead energized power line conductor, and a neutral conductor, comprising:
a first lightening arrestor having a first end and a second end, wherein said first end of said first lightening arrestor is connected to the first power line conductor;
a first high frequency impedance having a first end connected to said second end of said first lightening arrestor, said first impedance having a second end connected to the neutral conductor;
a second lightening arrestor having a first end and a second end, wherein said first end of said second lightening arrestor is connected to the second power line conductor;
a second high frequency impedance having a first end connected to said second end of said second lightening arrestor, said second impedance having a second end connected to the neutral conductor;
a transformer forming at least part of a balun and having a first winding and a second winding;
wherein said first winding is coupled to a communication device;
wherein said second winding has a first end connected to said first end of said first high frequency impedance; and
wherein said second winding has a second end connected to said first end of said second high frequency impedance.

12. The coupler of claim 11, wherein said first high frequency impedance and said second high frequency impedance each comprises an air core inductor.

13. The coupler of claim 11, wherein said first and second lightening arrestors are configured to differentially couple communications signals to the first and second power line conductors.

14. The coupler of claim 13, wherein the communication device is configured to:
determine that the first lightening arrestor is blown; and
transmit a notification upon determining that the first lightening arrestor is blown.

15. The coupler of claim 11, wherein:
said first end of said first impedance is connected to said second end of said first lightening arrestor via a first conductor;
said first end of said second impedance is connected to said second end of said second lightening arrestor via a second conductor; and
said first conductor and said second conductor are configured to form a two wire transmission line.

16. The coupler of claim 11, wherein said first high frequency impedance and said second high frequency impedance each comprises an air core inductor having a spiral portion.

17. The coupler of claim 11, wherein said first high frequency impedance and said second high frequency impedance are connected to the neutral conductor via a common conductor.

18. A method of coupling communication signals to and from first and second energized power line conductors, comprising:
providing a first data path from the first energized conductor through a first lightening arrestor to a first terminal of a communication device;
wherein the first data path includes a balun disposed between the first lightening arrestor and the first terminal of the communication device;
providing a second data path from the second energized conductor through a second lightening arrestor to a second terminal of the communication device; and
wherein the second data path includes the balun which is further disposed between the second lightening arrestor and the second terminal of the communication device.

19. The method of claim 18, further comprising:
providing a first lightening path configured to conduct electricity from a lightening strike that includes the first lightening arrestor and a ground conductor; and
providing a second lightening path configured to conduct electricity from a lightening strike that includes the second lightening arrestor and the ground conductor.

20. The method of claim 19, wherein the first lightening path and the second lightening path further include a common conductor.

21. The method of claim 19, wherein:
the first lightening path further includes a first high frequency impedance; and
the second lightening path further includes a second high frequency impedance.

22. The method of claim 19, wherein:
the first lightening path further includes a first air core inductor; and
the second lightening path further includes a second air core inductor.

23. The method of claim 22, wherein the first air core inductor and the second air core inductor each comprises a spiral portion.

24. The method of claim 18, further comprising differentially coupling a communication signal from the communication device to the first and second energized power line conductors via the first data path and the second data path.

25. The method claim 18, further comprising:
providing a first conductive path that includes a first high frequency impedance between the first lightening arrestor and a neutral conductor; and
providing a second conductive path that includes a second high frequency impedance between the second lightening arrestor and the neutral conductor.

26. The method claim 18, further comprising:
providing a first conductive path that includes a first air core inductor between the first lightening arrestor and a neutral conductor; and
providing a second conductive path that includes a second air core inductor between the second lightening arrestor and the neutral conductor.

* * * * *